(12) United States Patent
Abe

(10) Patent No.: US 9,274,583 B2
(45) Date of Patent: Mar. 1, 2016

(54) SEMICONDUCTOR INTEGRATED CIRCUIT

(75) Inventor: Makio Abe, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 615 days.

(21) Appl. No.: 13/060,085

(22) PCT Filed: Aug. 26, 2009

(86) PCT No.: PCT/JP2009/064866
§ 371 (c)(1),
(2), (4) Date: Feb. 22, 2011

(87) PCT Pub. No.: WO2010/026901
PCT Pub. Date: Mar. 11, 2010

(65) Prior Publication Data
US 2011/0153241 A1    Jun. 23, 2011

(30) Foreign Application Priority Data
Sep. 4, 2008    (JP) .................. 2008-227577

(51) Int. Cl.
G06F 1/32    (2006.01)
G06F 1/26    (2006.01)
H01M 10/48    (2006.01)
H02J 9/00    (2006.01)
H02J 7/00    (2006.01)

(52) U.S. Cl.
CPC .............. *G06F 1/3203* (2013.01); *G06F 1/26* (2013.01); *H01M 10/48* (2013.01); *H02J 7/0031* (2013.01); *H02J 9/005* (2013.01)

(58) Field of Classification Search
CPC ................................ H02J 7/0031; H02J 9/005
USPC ................................................... 702/63
See application file for complete search history.

(56) References Cited

U.S. PATENT DOCUMENTS

| | | | |
|---|---|---|---|
| 4,222,038 A * | 9/1980 | Magerl | 341/26 |
| 2002/0083357 A1* | 6/2002 | McGowan et al. | 713/323 |
| 2004/0263119 A1 | 12/2004 | Meyer et al. | |
| 2005/0025550 A1* | 2/2005 | McLoone | 400/472 |
| 2007/0188133 A1* | 8/2007 | Nakano et al. | 320/112 |
| 2007/0188212 A1 | 8/2007 | Abe | |
| 2008/0157720 A1* | 7/2008 | Yang | 320/135 |
| 2009/0287434 A1* | 11/2009 | Su | G01R 31/3606 702/63 |
| 2010/0001812 A1* | 1/2010 | Kausch | 333/172 |

FOREIGN PATENT DOCUMENTS

| | | |
|---|---|---|
| JP | 05-108539 | 4/1993 |
| JP | 3342507 | 11/2002 |

(Continued)

OTHER PUBLICATIONS

Japanese Office Action mailed Apr. 30, 2013.

*Primary Examiner* — Mischita Henson
*Assistant Examiner* — Terence Stifter, Jr.
(74) *Attorney, Agent, or Firm* — IPUSA, PLLC

(57) ABSTRACT

A semiconductor integrated circuit includes a central processing unit 21 the operation of which is stopped or slowed down in a sleep mode; an edge detection unit 23 detecting an edge of an interrupt signal supplied from the outside and generating an edge detection signal; and a data holding unit 22 holding data supplied from the outside when the edge detection signal is received. The central processing unit 21 reads the data held by the data holding unit 22 after returning from the sleep mode to an active mode in response to the interrupt signal.

1 Claim, 5 Drawing Sheets

(56) References Cited

FOREIGN PATENT DOCUMENTS

| | | |
|---|---|---|
| JP | 2005-012960 | 1/2005 |
| JP | 2005-151794 | 6/2005 |
| JP | 2007-240523 | 9/2007 |
| JP | 2007-249945 | 9/2007 |
| JP | 2008-123538 | 5/2008 |

* cited by examiner

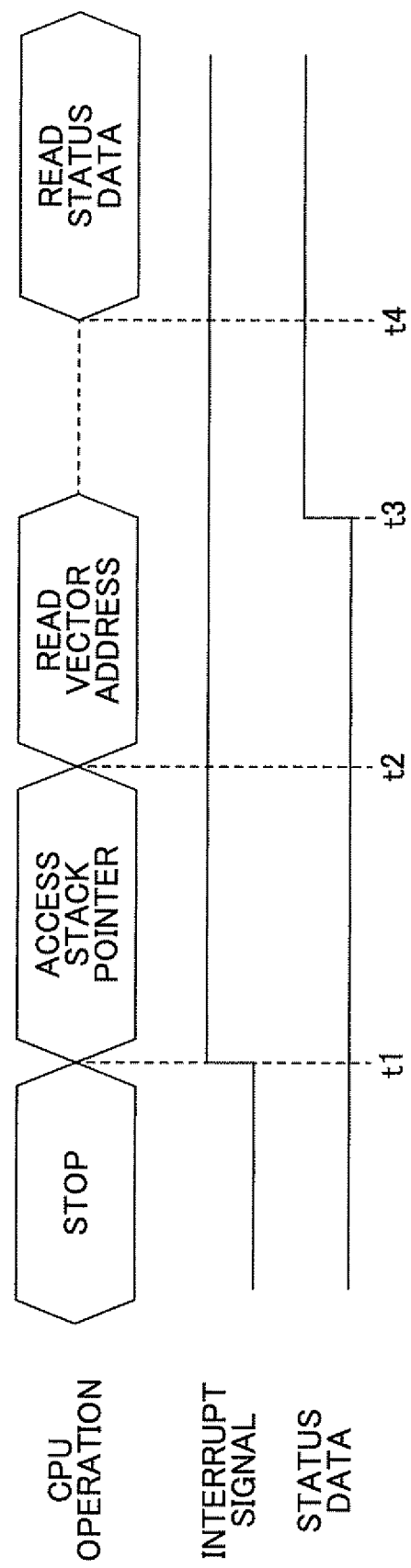

US 9,274,583 B2

SEMICONDUCTOR INTEGRATED CIRCUIT

TECHNICAL FIELD

The present invention generally relates to a semiconductor integrated circuit. More particularly, the present invention relates to a semiconductor integrated circuit including a central processing unit that stops or slows down its operation in a sleep mode.

BACKGROUND ART

FIG. 4 is a drawing illustrating a configuration of a related-art battery pack. The battery pack includes a lithium-ion battery 1, a fuel gauge IC 2, and a protection IC 3. The battery pack also includes power supply terminals 5 and 6 and a communication terminal 7 that are connected to a battery-powered device such as a cell phone or a digital camera.

The fuel gauge IC 2 includes a CPU 2A and may also include other components such as a memory and a communication circuit. The fuel gauge IC 2 detects charge and discharge currents of the lithium-ion battery 1, calculates a remaining battery level (or a remaining energy level) of the lithium-ion battery 1 by digitizing and totaling the detected charge and discharge currents, and sends the calculated remaining battery level via the communication circuit to the battery-powered device such as a cell phone or a digital camera.

The protection IC 3 turns off a switch 4 provided in a charge/discharge path and thereby stops charging or discharging of the lithium-ion battery 1 if overcharge or overdischarge of the lithium-ion battery 1 is detected. The protection IC 3 also generates status data indicating the overcharge or the overdischarge while the switch 4 is turned off and supplies the status data together with an interrupt signal to the fuel gauge IC 2.

Meanwhile, patent document 1 discloses a data processing unit that operates in multiple control modes including a measurement mode for measuring the remaining battery level of a battery. In the measurement mode, the current level supplied from the battery is minimized to save power.

[Patent document 1] Japanese Laid-Open Patent Publication No. 2005-12960

DISCLOSURE OF INVENTION

Problems to be Solved by the Invention

While the fuel gauge IC 2 is used to measure the remaining battery level of the lithium-ion battery 1, the fuel gauge IC 2 itself is also supplied with operating power by the lithium-ion battery 1. Therefore, it is important to reduce the consumption current of the fuel gauge IC 2 as much as possible.

For this purpose, if charging and discharging of the lithium-ion battery 1 have not been performed for a long period of time, the fuel gauge IC 2 enters a sleep mode and the operation of the CPU 2A of the fuel gauge IC 2 is stopped or slowed down.

Here, there is a case where charging or discharging of the lithium-ion battery 1 is started and the protection IC 3 detects overcharge or overdischarge while the fuel gauge IC 2 is in the sleep mode. As illustrated in FIG. 5, if an interrupt signal rises at time t1 during the sleep mode where the operation of the CPU 2A of the fuel gauge IC 2 is stopped or slowed down, the CPU 2A accesses a stack pointer to return to an active mode where the CPU 2A operates normally at high speed and also performs processing such as reading a vector address during a period between time t2 and time t4 to respond to the interrupt. Then, at time t4, the CPU 2A reads status data supplied from the protection IC 3.

With this configuration, it takes a long time after the interrupt signal rises at time t1 to read the status data at time t4. Accordingly, if the status data output by the protection IC 3 change at time t3 between time t1 and time t4, the CPU 2A cannot read correct status data as of time t1.

An aspect of the present invention makes it possible to reduce or solve the above problem and provides a semiconductor integrated circuit that can correctly read data supplied from the outside during a sleep mode.

Means for Solving the Problems

According to an aspect of the present invention, a semiconductor integrated circuit includes a central processing unit (21) the operation of which is stopped or slowed down in a sleep mode; an edge detection unit (23) detecting an edge of an interrupt signal supplied from the outside and generating an edge detection signal; and a data holding unit (22) holding data supplied from the outside when the edge detection signal is received. The central processing unit (21) reads the data held by the data holding unit (22) after returning from the sleep mode to an active mode in response to the interrupt signal.

The semiconductor integrated circuit is preferably configured to calculate the remaining battery level of a battery by detecting and totaling charge and discharge currents of the battery.

The data supplied from the outside are preferably status data of an external circuit.

The reference numbers enclosed in brackets in the above descriptions are provided to facilitate the understanding of the present invention. However, the scope of the present invention is not limited by the reference numbers.

ADVANTAGEOUS EFFECT OF THE INVENTION

An aspect of the present invention makes it possible to provide a semiconductor integrated circuit that can correctly read data supplied from the outside during a sleep mode.

BRIEF DESCRIPTION OF THE DRAWINGS

FIG. 5 is a drawing used to describe operations of the related-art fuel gauge IC.

BEST MODE FOR CARRYING OUT THE INVENTION

<Configuration of Semiconductor Integrated Circuit>

Figure 1:
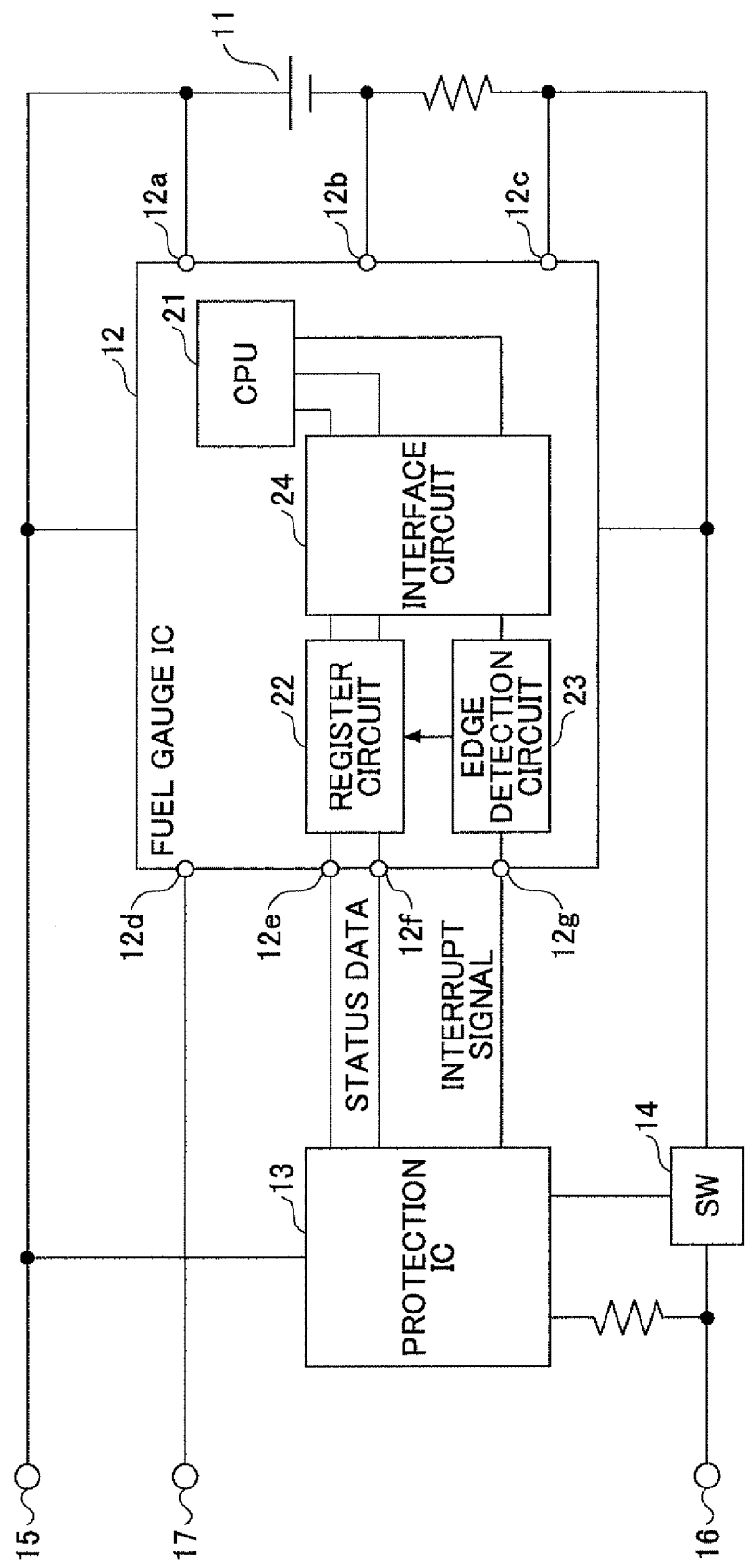
FIG. 1 is a drawing illustrating a configuration of a battery pack including a fuel gauge IC that is an example of a semiconductor integrated circuit according to an embodiment of the present invention.

FIG. 1 is a drawing illustrating a configuration of a battery pack including a fuel gauge IC that is an example of a semiconductor integrated circuit according to an embodiment of the present invention. As illustrated in FIG. 1, the battery pack includes a lithium-ion battery 11, a fuel gauge IC 12, and a protection IC 13. The battery pack also includes power supply terminals 15 and 16 and a communication terminal 17 that are connected to a battery-powered device such as a cell phone or a digital camera. When the battery pack is being charged, the power supply terminals 15 and 16 are connected to a charging circuit.

The fuel gauge IC 12 includes a central processing unit (CPU) 21, a register circuit 22, an edge detection circuit 23, and an interface circuit 24 and may also include other components such as a memory and a communication circuit that are not shown. The fuel gauge IC 12 detects charge and discharge currents of the lithium-ion battery 11 based on voltages measured at terminals 12a, 12b, and 12c, calculates a remaining battery level of the lithium-ion battery 11 by digitizing and totaling the detected charge and discharge currents, and sends the calculated remaining battery level via the communication circuit, a terminal 12d, and the terminal 17 to the battery-powered device such as a cell phone or a digital camera.

The protection IC 13 turns off a switch 14 provided in a charge/discharge path and thereby stops charging or discharging of the lithium-ion battery 11 if overcharge or overdischarge of the lithium-ion battery 11 is detected. The protection IC 13 also generates status data indicating the overcharge or the overdischarge while the switch 14 is turned off and supplies the status data together with an interrupt signal to the fuel gauge IC 12.

If charging and discharging of the lithium-ion battery 11 have not been performed for a long period of time, the fuel gauge IC 12 enters a sleep mode and the operation of the CPU 21 of the fuel gauge IC 12 is stopped or slowed down.

The register circuit 22 is connected to terminals 12e and 12f to which the status data are supplied from the protection IC 13. The edge detection circuit 23 is connected to an external terminal 12g to which the interrupt signal is supplied from the protection IC 13.

The edge detection circuit 23 detects a rising edge of the interrupt signal, generates an edge detection signal, and supplies the edge detection signal to the register circuit 22 and to the CPU 21 via the interface circuit 24.

When receiving the edge detection signal from the edge detection circuit 23, the register circuit 22 latches (or holds) the status data supplied from the protection IC 13 via the terminals 12e and 12f and supplies the latched status data via the interface circuit 24 to the CPU 21. In the descriptions below, it is assumed that the status data are represented by two bits. However, the status data may be represented by one bit or three or more bits.

<Configurations of Register Circuit and Edge Detection Circuit>

Figure 2:
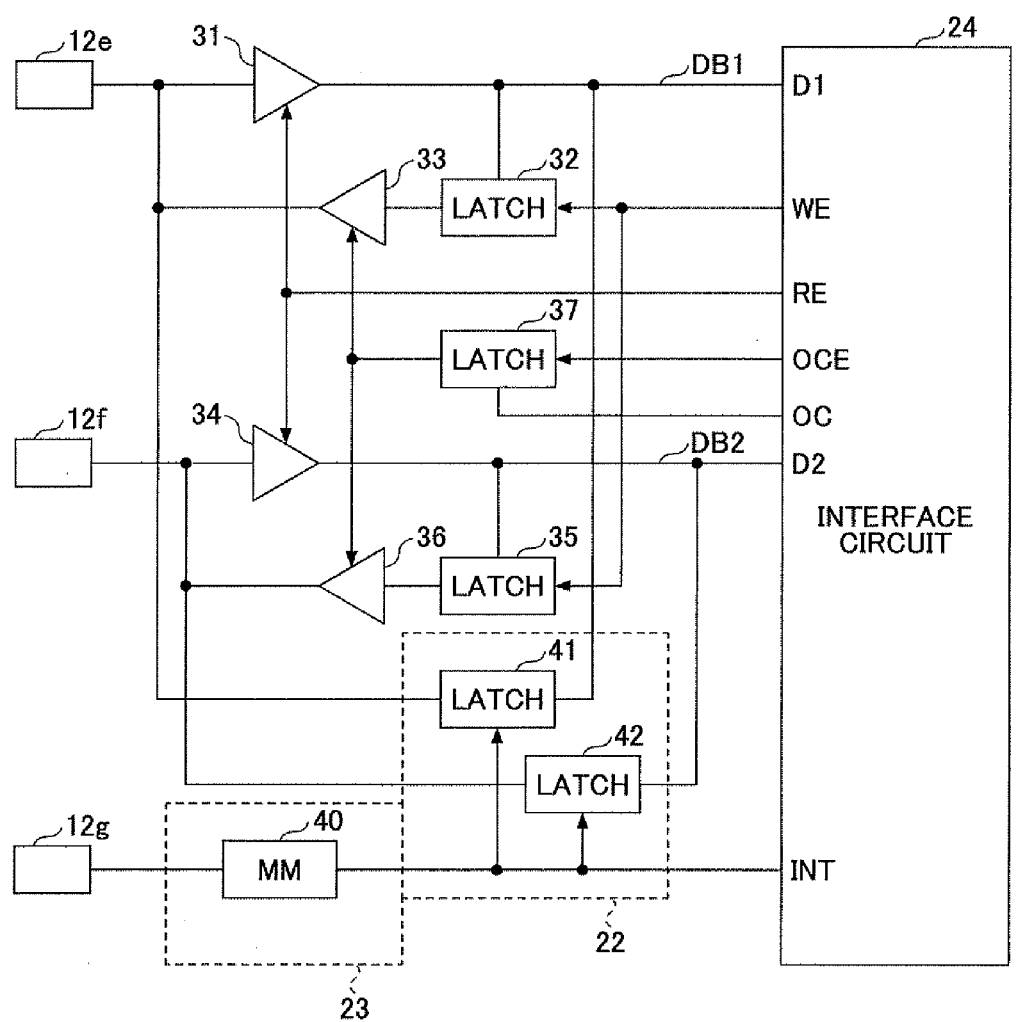
FIG. 2 is a circuit diagram illustrating a register circuit and an edge detection circuit according to an embodiment of the present invention.

FIG. 2 is a circuit diagram illustrating the register circuit 22 and the edge detection circuit 23 of this embodiment. In FIG. 2, it is assumed that the first bit of the status data is supplied to the terminal 12e. The terminal 12e is connected via a tristate buffer 31 and a data bus DB1 to a terminal D1 of the interface circuit 24. The data bus DB1 is also connected to an input terminal of a latch circuit 32. An output terminal of the latch circuit 32 is connected via a tristate buffer 33 to the terminal 12e. An enable signal WE is supplied from a terminal WE of the interface circuit 24 to a control terminal of the latch circuit 32.

The second bit of the status data is supplied to the terminal 12f. The terminal 12f is connected via a tristate buffer 34 and a data bus DB2 to a terminal D2 of the interface circuit 24. The data bus DB2 is also connected to an input terminal of a latch circuit 35. An output terminal of the latch circuit 35 is connected via a tristate buffer 36 to the terminal 12f. The enable signal WE is supplied from the terminal WE of the interface circuit 24 to a control terminal of the latch circuit 35.

An output control signal OC is supplied from a terminal OC of the interface circuit 24 to an input terminal of a latch circuit 37. The latch circuit 37 latches the output control signal OC when an enable signal OCE is supplied from a terminal OCE of the interface circuit 24 to a control terminal of the latch circuit 37. The latched output control signal OC is supplied to control terminals of the tristate buffers 33 and 36. An enable signal RE is supplied from a terminal RE of the interface circuit 24 to control terminals of the tristate buffers 31 and 34.

With the above configuration, when the enable signal RE is output from the interface circuit 24, the status data are supplied from the terminals 12e and 12f via the tristate buffers 31 and 34 to the terminals D1 and D2 of the interface circuit 24.

When the enable signal WE is output from the interface circuit 24, data output from the terminals D1 and D2 of the interface circuit 24 are latched by the latch circuits 32 and 35 and supplied to input terminals of the tristate buffers 33 and 36.

Also, when the enable signal OCE is output from the interface circuit 24, the output control signal OC from the interface circuit 24 is latched by the latch circuit 37 and supplied to the control terminals of the tristate buffers 33 and 36. As a result, the data output from the interface circuit 24 and latched by the latch circuits 32 and 35 are output from the tristate buffers 33 and 36 to the terminals 12e and 12f. Thus, the terminals 12e and 12f are used as input-output terminals.

The edge detection circuit 23 includes a monostable multivibrator (MM) 40 that outputs a pulse with a constant width if the signal voltage at the terminal 12g exceeds a predetermined threshold. The monostable multivibrator 40 generates a rising edge detection signal if the signal voltage supplied to the terminal 12g exceeds the threshold and supplies the edge detection signal to the register circuit 22 and an interrupt terminal INT of the interface circuit 24.

The register circuit 22 includes latch circuits 41 and 42. An input terminal of the latch circuit 41 is connected to the terminal 12e and an output terminal of the latch circuit 41 is connected to the data bus DB1. When the edge detection signal is supplied from the monostable multivibrator 40 to a control terminal of the latch circuit 41, the latch circuit 41 latches data supplied from the terminal 12e and supplies the latched data via the data bus DB1 to the terminal D1 of the interface circuit 24.

An input terminal of the latch circuit 42 is connected to the terminal 12f and an output terminal of the latch circuit 42 is connected to the data bus DB2. When the edge detection signal is supplied from the monostable multivibrator 40 to a control terminal of the latch circuit 42, the latch circuit 42 latches data supplied from the terminal 12f and supplies the latched data via the data bus DB2 to the terminal D2 of the interface circuit 24.

Figure 3:
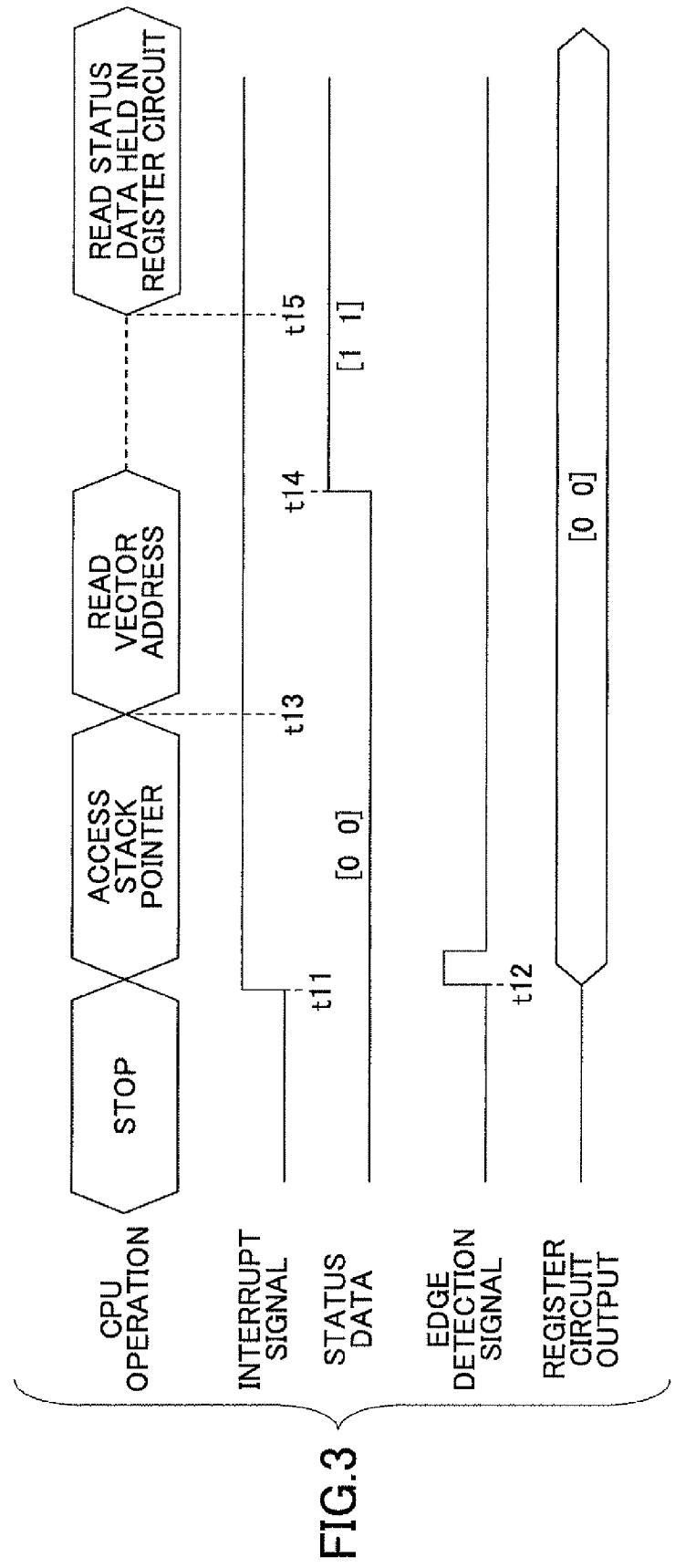
FIG. 3 is a drawing used to describe operations of a fuel gauge IC according to an embodiment of the present invention.
Figure 4:
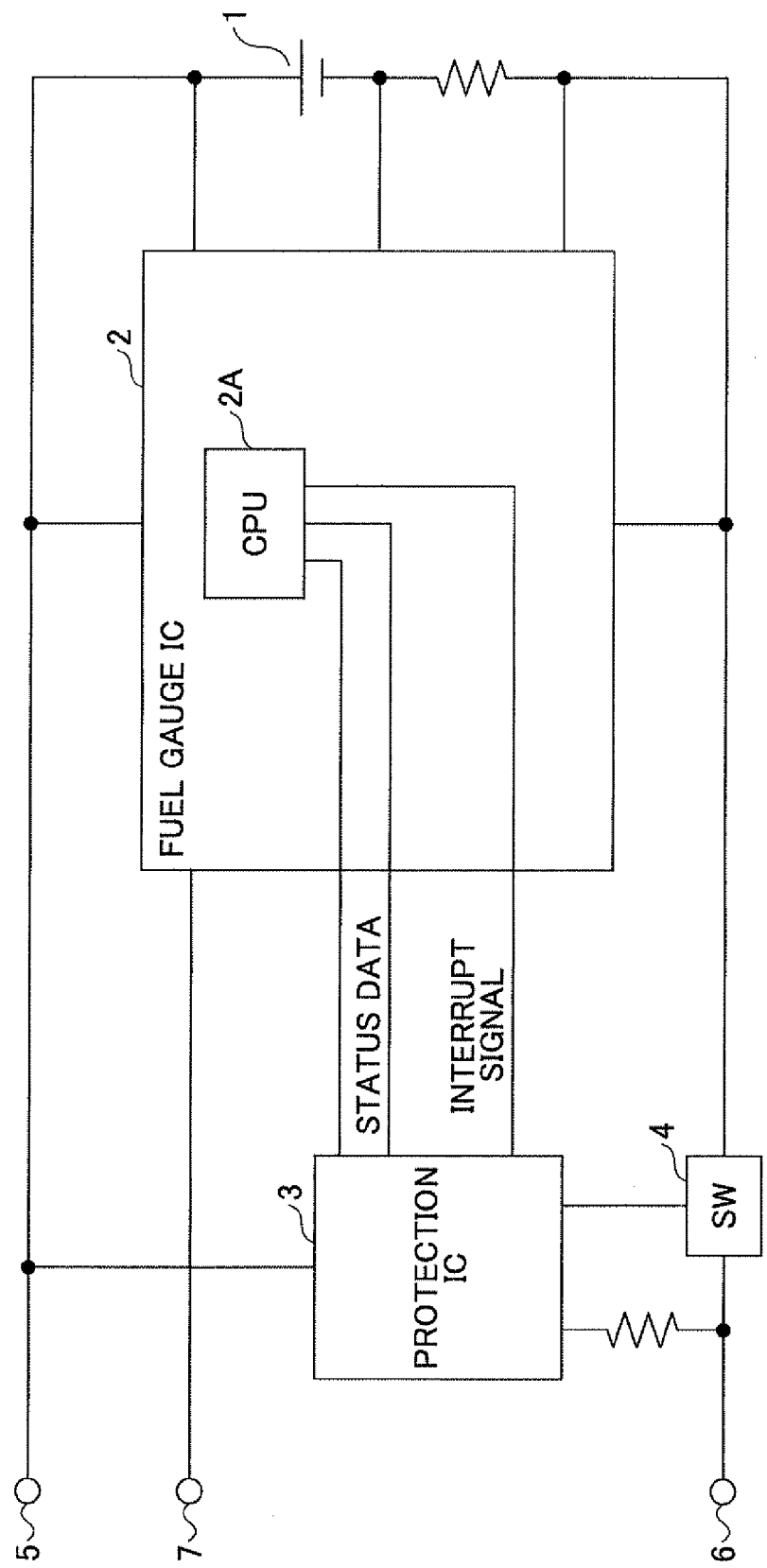
FIG. 4 is a drawing illustrating a configuration of a related-art battery pack.

Let us assume a case where charging or discharging of the lithium-ion battery 11 is started and the protection IC 13 detects overcharge or overdischarge while the fuel gauge IC 12 is in the sleep mode. As illustrated in FIG. 3, if the interrupt signal rises at time t11 while the fuel gauge IC 12 is in the sleep mode and the operation of the CPU 21 is stopped, the CPU 21 accesses a stack pointer to return to an active mode where the CPU 21 operates normally at high speed and also performs processing such as reading a vector address during a period between time t13 and time t15 to respond to the interrupt.

Also, at time t12 that is slightly later than time t11, the edge detection circuit 23 generates an edge detection signal to cause the register circuit 22 to hold status data [00]. Then, the CPU 21 reads, at time t15, the status data [00] held by the register circuit 22 at time t12 even if the status data have changed from [00] to [11] at time t14 that is earlier than time t15. This configuration makes it possible to read the correct status data [00] as of time t12 when the interrupt signal has risen.

Although a fuel gauge IC is used as an example of a semiconductor integrated circuit in the above embodiment, the present invention may be applied to any type of semiconductor integrated circuit including a CPU the operation of which is stopped or slowed down in a sleep mode. Also, the data to be supplied from the outside to the semiconductor integrated circuit together with an interrupt signal are not limited to status data. Further, instead of detecting the rising edge of an interrupt signal (i.e., the high active state of the interrupt signal), the falling edge of an interrupt signal (i.e., the low active state of the interrupt signal) may be detected.

The present international application claims priority from Japanese Patent Application No. 2008-227577 filed on Sep. 4, 2008, the entire contents of which are hereby incorporated herein by reference.

EXPLANATION OF REFERENCES

11 Lithium-ion battery
12 Fuel gauge IC
13 Protection IC
15, 16 Power supply terminal
17 Communication terminal
21 CPU
22 Register circuit
23 Edge detection circuit
24 Interface circuit
31, 33, 34, 36 Tristate buffer
32, 35, 37, 41, 42 Latch circuit
40 Monostable multivibrator

The invention claimed is:

1. A semiconductor integrated circuit that is connected to a protection circuit for protecting a battery and calculates a remaining battery level of the battery by detecting and totaling charge and discharge currents of the battery, the semiconductor integrated circuit comprising:
 a central processing unit an operation of which is stopped or slowed down in a sleep mode;
 an edge detection unit generating an edge detection signal by detecting an edge of an interrupt signal supplied from the protection circuit,
  wherein the interrupt signal is to cause the central processing unit to return to an active mode where the central processing unit operates at high speed; and
 a data holding unit holding status data, which is supplied from the protection circuit, in response to the edge detection signal at substantially a same timing as a timing when the edge of the interrupt signal is detected, the status data being different from the interrupt signal and indicating a status of the battery,
 wherein the status data supplied from the protection circuit changes from first status data to second status data after the data holding unit holds the first status data and the edge detection signal is generated, the first status data indicating a first status of the battery, and the second status data indicating a second status of the battery different from the first status, and
 wherein the central processing unit reads the first status data held by the data holding unit after returning from the sleep mode to the active mode to read data, in response to the interrupt signal, while ignoring the second status data when the central processing unit returns to the active mode to read data.

* * * * *